(12) United States Patent
Tsuna

(10) Patent No.: US 10,145,417 B2
(45) Date of Patent: Dec. 4, 2018

(54) GREASE COMPOSITION-FILLED BALL BEARING, PIVOT ASSEMBLY BEARING INCLUDING THE BALL BEARING, AND HARD DISK DRIVE INCLUDING THE PIVOT ASSEMBLY BEARING

(71) Applicant: Minebea Mitsumi Inc., Nagano (JP)

(72) Inventor: Motojiro Tsuna, Miyota (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/637,118

(22) Filed: Jun. 29, 2017

(65) Prior Publication Data

US 2018/0003233 A1  Jan. 4, 2018

(30) Foreign Application Priority Data

Jun. 30, 2016 (JP) ................................. 2016-129663
Jun. 29, 2017 (JP) ................................. 2017-126873

(51) Int. Cl.
*F16C 33/66* (2006.01)
*B23P 15/00* (2006.01)
(Continued)

(52) U.S. Cl.
CPC ........ *F16C 33/6633* (2013.01); *B23P 15/003* (2013.01); *C10M 169/06* (2013.01); *F16C 19/54* (2013.01); *G11B 5/4806* (2013.01); *G11B 5/4813* (2013.01); *C10M 2203/1006* (2013.01); *C10M 2203/1025* (2013.01); *C10M 2205/0285* (2013.01); *C10M 2207/2805* (2013.01); *C10M 2207/2835* (2013.01); *C10M 2215/1026* (2013.01); *C10M 2223/041* (2013.01); *C10N 2220/022* (2013.01); *C10N 2230/02* (2013.01);
(Continued)

(58) Field of Classification Search
CPC .... F16C 19/54; F16C 33/6633; F16C 33/664; F16C 33/6607; F16C 2370/12; G11B 5/4806; B23P 15/003; C10N 2240/02; C10M 169/02; C10M 169/04; C10M 2207/003; C10M 2207/2805
USPC ........ 384/462, 463, 467, 492, 470; 366/244; 508/490, 591, 468, 579
See application file for complete search history.

(56) References Cited

U.S. PATENT DOCUMENTS 5,910,470 A * 6/1999 Minami ............... C10M 169/00
 508/468
6,329,326 B1 * 12/2001 Iso ....................... C10M 169/02
 508/182
(Continued)

FOREIGN PATENT DOCUMENTS

EP  1897930 A1 *  3/2008  .......... C10M 169/02
EP  3118287 A1 *  1/2017  .......... C10M 135/10
(Continued)

*Primary Examiner* — Marcus Charles
(74) *Attorney, Agent, or Firm* — Pearne & Gordon LLP

(57) ABSTRACT

A ball bearing is filled with a grease composition. The grease composition contains a synthetic oil other than a synthetic hydrocarbon oil, a synthetic hydrocarbon oil, a mineral oil, and a urea compound. The synthetic oil other than the synthetic hydrocarbon oil is contained in an amount of 10% by mass or more and 60% by mass or less when the total of the synthetic oil other than the synthetic hydrocarbon oil, the synthetic hydrocarbon oil and the mineral oil is taken as 100% by mass.

12 Claims, 1 Drawing Sheet

(51) Int. Cl.
*F16C 19/54* (2006.01)
*G11B 5/48* (2006.01)
*C10M 169/06* (2006.01)

(52) U.S. Cl.
CPC ...... *C10N 2230/06* (2013.01); *C10N 2230/70* (2013.01); *C10N 2240/02* (2013.01); *C10N 2250/10* (2013.01); *F16C 2370/12* (2013.01)

(56) References Cited

U.S. PATENT DOCUMENTS

| | | | | |
|---|---|---|---|---|
| 7,008,115 | B2* | 3/2006 | Nakata | F16C 19/38 384/463 |
| 9,150,809 | B2* | 10/2015 | Kawamura | C10M 115/08 |
| 2008/0166080 | A1* | 7/2008 | Kawamura | C10M 169/02 384/462 |
| 2009/0029881 | A1* | 1/2009 | Okamura | C10M 169/02 508/100 |
| 2009/0136172 | A1* | 5/2009 | Egami | B60B 27/00 384/589 |
| 2012/0316091 | A1* | 12/2012 | Kawamura | C10M 115/08 508/100 |
| 2013/0157915 | A1* | 6/2013 | Azuma | C10M 169/06 508/408 |
| 2013/0170777 | A1* | 7/2013 | Ito | C10M 169/00 384/462 |
| 2015/0030275 | A1* | 1/2015 | Tsuna | F16C 33/6651 384/470 |
| 2015/0170688 | A1* | 6/2015 | Hanke | F16C 33/6633 360/244 |
| 2015/0299608 | A1* | 10/2015 | Tsutsui | C10M 169/02 508/386 |
| 2017/0074326 | A1* | 3/2017 | Sato | C10M 135/10 |

FOREIGN PATENT DOCUMENTS

| | | | | |
|---|---|---|---|---|
| JP | 2003-239954 A | | 8/2003 | |
| JP | 5516679 B2 * | | 6/2014 | ........ C10M 169/04 |

* cited by examiner

GREASE COMPOSITION-FILLED BALL BEARING, PIVOT ASSEMBLY BEARING INCLUDING THE BALL BEARING, AND HARD DISK DRIVE INCLUDING THE PIVOT ASSEMBLY BEARING

CROSS-REFERENCE TO RELATED APPLICATION(S)

This application is based upon and claims the benefit of priority from Japanese Patent Application No. 2016-129663 filed in Japan on Jun. 30, 2016, and Japanese Patent Application No. 2017-126873, filed on Jun. 29, 2017; the entire contents of which are incorporated herein by reference.

BACKGROUND OF THE INVENTION

1. Field of the Invention

The present invention relates to a ball bearing filled with a grease composition, a pivot assembly bearing including the ball bearing, and a hard disk drive including the pivot assembly bearing.

2. Description of the Related Art

In hard disk drives, pivot assembly bearings for oscillating an actuator that moves a magnetic head have been conventionally used. This pivot assembly bearing generally has a ball bearing, which is filled with a lubricant such as a grease composition.

Known as the grease composition for pivot assembly bearing is a grease composition containing a paraffinic mineral oil and a poly-α-olefin as a base oil, an alicyclic-aliphatic mixed diurea compound as a thickener, and an extreme pressure agent (Japanese Patent Application Laid-open No. 2003-239954).

To extend the life of a hard disk drive, the grease composition for use in the pivot assembly bearing (specifically, a grease composition filling the ball bearing of the pivot assembly bearing) is required to be excellent in outgas characteristics and oil separability. To enable the hard disk drive to be used on low power consumption even at low temperatures, the grease composition filling the pivot assembly bearing is also required to be excellent in low temperature torque characteristics.

However, when the grease composition of Japanese Patent Application Laid-open No. 2003-239954 is used, outgas originating from the grease composition filled in the pivot assembly bearing may be produced as the hard disk drive is used. When this outgas adheres to the magnetic head, reading and writing errors may occur, and the life of the hard disk drive may be shortened.

A grease composition used for a ball bearing in bearing devices other than the pivot assembly bearing is also required to be excellent in outgas characteristics, oil separability, and low temperature torque characteristics.

SUMMARY OF THE INVENTION

The present invention is made in view of the foregoing and is aimed to provide a ball bearing which can give a device which has a long life and can be used on lower power consumption even at low temperatures by using a grease composition excellent in outgas characteristics, oil separability and low temperature torque characteristics.

A ball bearing according to an embodiment is filled with a grease composition including a synthetic oil other than a synthetic hydrocarbon oil, a synthetic hydrocarbon oil, a mineral oil, and a urea compound. The synthetic oil other than the synthetic hydrocarbon oil is contained in an amount of 10% by mass or more and 60% by mass or less when a total of the synthetic oil other than the synthetic hydrocarbon oil, the synthetic hydrocarbon oil and the mineral oil is taken as 100% by mass.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Grease Composition

Figure 1:
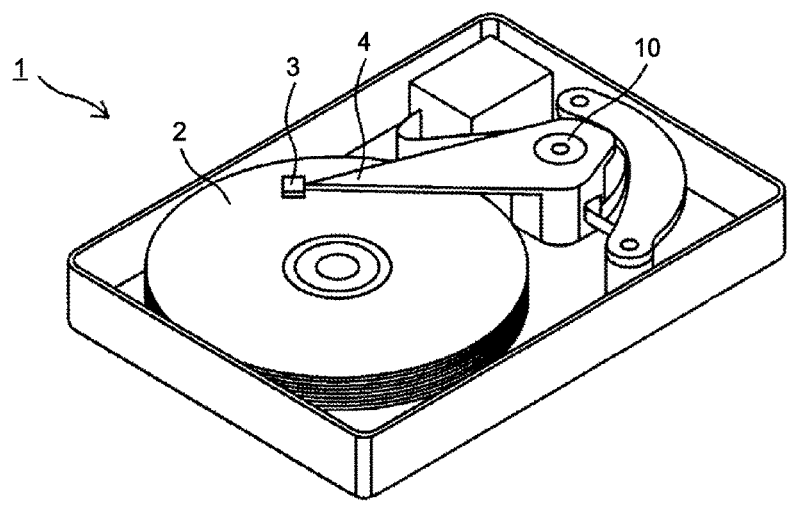
FIG. 1 is an opened-up perspective view of a hard disk drive having a pivot assembly bearing including ball bearings.

First, the following specifically describes a grease composition for use in a ball bearing according to the present embodiment.

The grease composition for use in the ball bearing contains a base oil and a thickener. The grease composition is normally a mixture of the base oil and the thickener and is a semi-solid or solid lubricant.

Base Oil

In the grease composition, the base oil contains a synthetic oil other than a synthetic hydrocarbon oil, a synthetic hydrocarbon oil and a mineral oil. In the following description, the synthetic hydrocarbon oil and the mineral oil may be collectively called a "hydrocarbon-based base oil". The synthetic oil other than the synthetic hydrocarbon oil may be called "another (the other) synthetic oil".

Examples of the synthetic hydrocarbon oil include poly-α-olefins (PAOs) and hydrides thereof, ethylene-α-olefin copolymers (oligomers), polybutenes, alkylbenzenes, and alkylnaphthalenes. The synthetic hydrocarbon oil may be used singly or used in combination of two or more.

Specific examples of the poly-α-olefins include oligomers such as dimers, trimers, and tetramers of 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-dococene, and the like. Using any of the poly-α-olefins, especially using the oligomer of 1-decene provides an increased viscosity index and favorable fluidity at low temperatures, thereby improving the low temperature torque characteristics of the grease composition.

The mineral oil is oil obtained by refining crude oil; examples of the mineral oil include naphthenic oils and paraffinic oils. The mineral oil may be used singly or used in combination of two or more. Using the mineral oil in addition to the synthetic oil has advantages in that oxidation stability is improved and that lubricating properties are improved.

The synthetic hydrocarbon oil is preferably contained in an amount of 30% by mass or more and 70% by mass or less, and the mineral oil is preferably contained in an amount of 30% by mass or more and 70% by mass or less when the total of the synthetic hydrocarbon oil and the mineral oil is taken as 100% by mass.

Examples of the other synthetic oil include ester oils and ether oils. The other synthetic oil may be used singly or used in combination of two or more.

Examples of the ester oils include polyol ester oils, diester oils, monoester oils, aromatic ester oils, and complex ester oils as oligoesters of polyols and mixed fatty acids of dibasic acids and monobasic acids.

Specific examples of the polyol ester oils include a trimethylol propane ester oil and a pentaerythritol ester oil. The trimethylol propane ester oil is represented by Formula (1) below, for example, and the pentaerythritol ester oil is represented by Formula (2) below, for example. $R^1$, $R^2$, and $R^3$ each represent an alkyl group, in which the carbon number of the alkyl group is preferably selected so as to cause the ester oil to exhibit kinematic viscosity described below, is two or more and ten or less for $R^1$, and is five or more and ten or less for each of $R^2$ and $R^3$, for example.

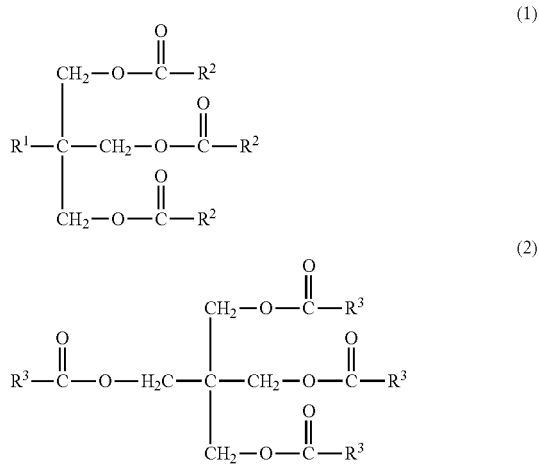

Examples of the trimethylol propane ester oil represented by Formula (1) include trimethylol propane caprylate and trimethylol propane pelargonate, and examples of the pentaerythritol ester oil represented by Formula (2) include pentaerythritol-tetra-2-ethylhexanoate and pentaerythritol tetrapelargonate.

Specific examples of the diester oils include dibutyl sebacate, di-2-ethylhexyl sebacate, dioctyl adipate, diisodecyl adipate, ditridecyl adipate, ditridecyl glutarate, and methyl acetyl recinoleate.

Specific examples of the aromatic ester oils include trioctyl trimellitate, tridecyl trimellitate, and tetraoctyl pyromellitate.

Examples of the ether oils include polyglycol oils and phenyl ether oils.

Specific examples of the polyglycol oils include polyethylene glycols, polypropylene glycols, polyethylene glycol monoethers, and polypropylene glycol monoethers.

Specific examples of the phenyl ether oils include monoalkyl triphenyl ethers, alkyl diphenyl ethers, dialkyl diphenyl ethers, pentaphenyl ethers, tetraphenyl ethers, monoalkyl tetraphenyl ethers, and dialkyl tetraphenyl ethers.

The present embodiment, using the synthetic hydrocarbon oil, the mineral oil, and the other synthetic oil, can obtain a grease composition excellent in low temperature torque characteristics as well as outgas characteristics and oil separability with a good balance. Among these, when the ester oil, especially the polyol ester oil such as the pentaerythritol ester oil is used as the other synthetic oil, a grease composition with a good balance of outgas characteristics and low temperature torque characteristics can be obtained.

As described above, the ester oil is preferably contained as the other synthetic oil. A combined use of the synthetic hydrocarbon oil, the mineral oil, and the ester oil alone as the base oil is particularly preferred in view of the life and the low temperature drive performance of a device including the ball bearing (a hard disk drive, for example).

The grease composition contains the synthetic hydrocarbon oil and the mineral oil in an amount of 40% by mass or more and 90% by mass or less in total and contains the other synthetic oil in an amount of 10% by mass or more and 60% by mass or less when the total of the synthetic hydrocarbon oil, the mineral oil, and the other synthetic oil is 100%. With this composition, the grease composition excellent in outgas characteristics, oil separability, and low temperature torque characteristics can be obtained. When the other synthetic oil such as the ester oil is contained in too excessive amount, the grease composition may be poor in life and oil separability. In other words, the life of the device including the ball bearing (the hard disk drive, for example) may be affected.

In view of the life of the grease composition and the life of the device including the ball bearing (the hard disk drive, for example), the synthetic hydrocarbon oil and the mineral oil are preferably contained in an amount of 70% by mass or more and 90% by mass or less in total, and the other synthetic oil is preferably contained in an amount of 10% by mass or more and 30% by mass or less.

The kinematic viscosity of the base oil at 40° C. is preferably 40 mm$^2$/s or higher and 80 mm$^2$/s or lower and more preferably 50 mm$^2$/s or higher and 70 mm$^2$/s or lower considering the life and the power consumption of the device including the ball bearing (the hard disk drive, for example).

The kinematic viscosity of the base oil at 0° C. is preferably 800 mm$^2$/s or lower and more preferably 300 mm$^2$/s or higher and 700 mm$^2$/s or lower in view of low temperature torque characteristics.

Although the synthetic hydrocarbon oil, the mineral oil, and the other synthetic oil contained in the base oil are not each independently required to have the kinematic viscosity within the above range, the kinematic viscosity when the synthetic hydrocarbon oil, the mineral oil, and the other synthetic oil are mixed is required to be within the above range.

There is currently a problem of adhesion of oil to a slider head of the hard disk drive (HDD) originating from the outgas. A grease with increased base oil viscosity can deal with this particular problem. However, simply increasing the base oil viscosity in the grease is not sufficient to solve the problem totally because this increases the viscosity in low temperature, which would require further improvement in torque at low temperatures. Given these circumstances, the inventors of the present invention have developed a grease with improved low temperature torque while reducing outgas.

In the HDD industry, there is concern about the outgas characteristics of greases, and the specifications thereof are becoming stricter year after year. Greases included in a lineup for pivot assembly bearing contain the hydrocarbon-based base oil (poly-α-olefin and mineral oil, for example). The hydrocarbon-based base oil (poly-α-olefin and mineral oil, for example) has difficulty in improving outgas characteristics and low temperature torque while keeping viscosity. For mineral oils, it was attempted to reduce the low molecular weight components by additional distillation, but it was observed that the life may degrade. On the other hand, when greases are prepared by a synthetic oil (an ester oil), torque tends to increase due to an increase in viscosity, although outgas characteristic is improved. In addition, because of poor gelling ability, there is a tendency for requiring a larger amount of the thickener, the amount of oil separation in a stationary state becomes extremely small, and fluctuation in torque and degradation in life can occur.

Considering these circumstances, the above problems have been solved by mixing the synthetic hydrocarbon oil, the mineral oil, and the other synthetic oil as described above.

Thickener

The grease composition contains a urea compound as the thickener.

Examples of the urea compound include diurea compounds, triurea compounds, tetraurea compounds, and other polyurea compounds. The urea compound may be used singly or used in combination of two or more.

Specific examples of the diurea compounds include a compound represented by Formula (3) below:

$$R^4NH-CO-NH-R^5-NH-CO-NH-R^6 \qquad (3)$$

In Formula (3), $R^4$ and $R^6$ are each a cyclohexyl group optionally having a substituent, an aryl group optionally having a substituent, or a linear or branched alkyl group with carbon number of 6 or more and 22 or less. The carbon number of the cyclohexyl group is preferably 6 or more and 12 or less, and the carbon number of the aryl group is preferably 6 or more and 18 or less. $R^5$ is a divalent hydrocarbon group containing an arylene group optionally having a substituent, in which the carbon number of the hydrocarbon group is preferably 6 or more and 15 or less. Examples of the substituent include an alkyl group.

The urea compound is preferably any of the diurea compounds, especially an alicyclic-aliphatic diurea compound (a diurea compound in which both ends of the molecule are an aliphatic hydrocarbon group or an alicyclic hydrocarbon group). More specifically, more preferred is the diurea compound in which $R^4$ and $R^6$ are the linear or branched alkyl group or the cyclohexyl group in Formula (3). A combined use of the base oil described above and the diurea compound provides the device including the ball bearing (the hard disk drive, for example) that has a long life and can be used on lower power consumption even at low temperatures.

Considering the worked penetration, the grease composition preferably contains the thickener in an amount of 9 parts by mass or more and 18 parts by mass or less for each 100 parts by mass of the total mass of the base oil. Also considering the worked penetration, the thickener is contained in the grease composition normally in an amount of 8% by mass or more and 14% by mass or less.

Extreme Pressure Additive

The grease composition may further contain an extreme pressure additive as an additive. By adding the extreme pressure additive, wear and seizing can be suppressed.

Examples of the extreme pressure additive include organic molybdenum compounds, organic fatty acid compounds, organic phosphorous compounds, sulfur-containing organic phosphorous compounds, acid phosphate amine salts and the like. The extreme pressure additive may be used singly or used in combination of two or more.

The organic molybdenum compounds adhere to a bearing metallic surface, form a coating to function, and can improve resistance to seizing, load capability, and resistance to wear even under high load and low speed.

Molybdenum dithiophosphate represented by Formula (4) below or molybdenum dithiocarbamate represented by Formula (5) below is preferably used as the organic molybdenum compounds.

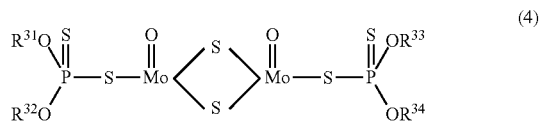

In Formula (4), $R^{31}$, $R^{32}$, $R^{33}$, and $R^{34}$ are each an alkyl group with carbon number of 1 and more to 24 or less, or an aryl group with carbon number of 6 or more and 30 or less.

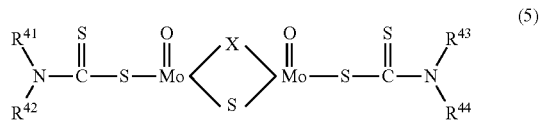

In Formula (5), $R^{41}$, $R^{42}$, $R^{43}$, and $R^{44}$ are each an alkyl group with carbon number of 1 and more to 24 or less, and X is O or S.

Further included are metal dihydrocarbyl dithiophosphates, metal dihydrocarbyl dithiocarbamates, and naphthenates; the metal is preferably zinc, lead, cadmium, antinomy, and the like. Examples of the metal dihydrocarbyl dithiophosphates include zinc dimethyl dithiophosphate, zinc butyl iso-octyl dithiophosphate, zinc di(4-methyl-2-pentyl) dithiophosphate, zinc di(tetrapropenylphenyl) dithiophosphate, zinc (2-ethyl-1-hexyl) dithiophosphate, zinc (iso-octyl) dithiophosphate, zinc (ethylphenyl) dithiophosphate, zinc (amyl) dithiophosphate, and zinc di(hexyl) dithiophosphate.

Examples of the organic fatty acid compounds include oleic acid, naphthenic acid, abietic acid, lanoline fatty acid, succinic acid, succinic acid derivatives, and amino acid derivatives. Succinic acid and the succinic acid derivatives favorably adhere to a rolling surface and a sliding surface which are a bearing material to form a thin film. Examples of the succinic acid derivatives include alkyl succinic acids, alkyl succinic acid half esters, alkenyl succinic acids, alkenyl succinic acid half esters, and succinic acid imide. Alkenyl succinic acids or anhydrides thereof are preferred as the succinic acid derivatives.

Phosphite esters are preferred as the organic phosphorous compounds. Phosphite esters having a hydrocarbon group are known as the phosphite esters; examples thereof include trioctyl phosphite, triphenyl phosphite, tricresyl phosphite, bis-2-ethylhexyl phosphite, tridecyl phosphite, dibutyl hydrogen phosphite, tris(nonylphenyl) phosphite, dilauryl hydrogen phosphite, diphenyl monodecyl phosphite, trilauryl trithio phosphite, and diphenyl hydrogen phosphite.

Orthophosphoric acid esters can also be used. Examples of the orthophosphoric acid esters include triphenyl phosphate, triethyl phosphate, tributyl phosphate, tris(2-ethylhexyl) phosphate, tris(2-ethylhexyl) phosphate, tridecyl phosphate, diphenyl mono(2-ethylhexyl) phosphate, tricresyl phosphate, trioctyl phosphate, and tristearyl phosphate.

Furthermore, phosphoric acid esters can also be used. Examples of the phosphoric acid esters include methyl acid phosphate, isopropyl acid phosphate, butyl acid phosphate, 2-ethylhexyl acid phosphate, isodecyl acid phosphate, tridecyl acid phosphate, and lauryl acid phosphate.

Examples of the sulfur-containing organic phosphorous compounds include thio substitutes of a phosphate and a phosphite such as trialkyl phosphorothionates, triaryl phosphorothionates and triphenyl phosphorothionates, for example.

The grease composition preferably contains the extreme pressure additive in an amount of 0.1 part by mass or more and 6.4 parts by mass or less for each 100 parts by mass of the total mass of the base oil considering the purpose of the extreme pressure additive described above. The extreme pressure additive is contained in the grease composition preferably in an amount of 0.1% by mass or more and 5% by mass or less and more preferably in an amount of 1% by mass or more and 3% by mass or less. If the amount of the extreme pressure additive is less than 0.1% by mass, the purpose of the extreme pressure additive may not be sufficiently achieved; if the amount of the extreme pressure additive exceeds 5% by mass, the amount of a corrosive gas produced may increase.

Other Additives

The grease composition may further contain other additives other than the extreme pressure additive.

Examples of the other additives include additives that are usually added to greases; specific examples thereof include antioxidants, anticorrosives, corrosion inhibitors, oiliness agents, and anti-wear agents. These additives may be used singly or used in combination of two or more.

Examples of the antioxidants include hindered-phenol antioxidants such as stearyl 3-(3,5-Di-tert-butyl-4-hydroxyphenyl)propionate, pentaerythritol tetrakis(3-(3,5-di-tert-butyl-4-hydroxyphenyl)propionate), 2,4-bis(n-octylthio)-6-(4-hydroxy-3,5-di-tert-butylanilino)-1,3,5-triazine, 1,3,5-trimethyl-2,4,6-tris(3,5-di-tert-butyl-4-hydroxybenzyl)benzene, triethylene glycol-bis[3-(3-tert-butyl-5-methyl-4-hydroxyphenyl)propionate, 1,6-dihydroxyhexanebis[3-(3,5-di-tert-butyl-4-hydroxyphenyl)propionate], 2,2-thiodiethylene bis[3-(3,5-di-tert-butyl-4-hydroxyphenyl) propionate] and N,N'-hexamethylen-bis(3,5-di-tert-butyl-4-hydroxy-hydrocinamide; phenol-based antioxidants such as 2,6-di-tert-butyl-4-methylphenol and 4,4'-methylenebis(2,6-di-tert-butylphenol); diphenylamine antioxidants such as p,p'-dioctyl-diphenylamine, p-p'-di-alpha-methylbenzyl-diphenylamine and bis(4-tert-butylphenyl)amine; triphenylamine; hinderedamine antioxidants such as tetrakis(1, 2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1,2,2,6,6-pentamethyl-4-piperidyl) sebacate and bis(2,2,6,6-tetramethyl-4-piperidyl) sebacate; naphthylamine antioxidants such as alpha-naphthylamin, phenyl-alpha-naphthylamine and alkyl phenyl-alpha-naphthylamine; and thiodiphenylamine antioxidants such as phenothiazine, N-methylphenothiazine, N-ethylphenothiazine, 3,7-dioctylphenothiazine, phenothiazine carboxylate and phenoselenazine, for example.

In the grease composition, the antioxidants are preferably contained in an amount of 0.2% by mass or more and 5% by mass or less. The other additives other than the antioxidants are also used as needed. The additives may be used singly or used in combination of two or more; when two or more are combined, the total of the amount of the additives is preferably 10% by mass or less in the grease composition.

The grease composition for use in the present embodiment preferably has a worked penetration (JIS K 2220 7) of 180 or more and 280 or less. The worked penetration in this range provides a grease composition with excellent lubrication performance and stable torque. By changing the types and the amounts of the base oil and the thickener described above as appropriate, the worked penetration can be adjusted to the above range.

The grease composition, for which the manufacturing method is not limited to a particular one, is generally obtained by reacting an isocyanate compound and an amine compound in the base oil to produce the thickener. In order to avoid to leave any reactive free radical, the isocyanate compound and the amine compound are preferably blended so as to make an isocyanate group of the isocyanate compound and an amino group of the amine compound substantially equivalent.

Specifically, when the thickener is the diurea compound, usually a diisocyanate is used as the isocyanate compound and a monoamine is used as the amine compound. Examples of the diisocyanate include phenylene diisocyanate, tolylene diisocyanate, diphenyl diisocyanate, diphenylmethane diisocyanate, octadecane diisocyanate, decane diisocyanate, and hexane diisocyanate. Examples of the monoamine include octyl amine, dodecyl amine, hexadecyl amine, stearyl amine, oleyl amine, aniline, p-toluidine, and cyclohexyl amine. Using these raw compounds, the diurea compound can be produced.

Next, the extreme pressure additive or the other additives can be added to the obtained composition as needed. After the addition of the extreme pressure additive or the other additives, the mixture is preferably thoroughly stirred by a kneader, a roll mill, or the like to be uniformly dispersed. During this stirring, the mixture may be heated.

Ball Bearing, Pivot Assembly Bearing, and Hard Disk Drive

The following specifically describes the ball bearing according to the present embodiment, that is, the ball bearing filled with the grease composition according to the present embodiment, a pivot assembly bearing including the ball bearing, and a hard disk drive including the pivot assembly bearing.

FIG. 1 illustrates an example of a hard disk drive having a pivot assembly bearing including a ball bearing. This hard disk drive 1 is a computer storage device and at least has a magnetic disk 2, a magnetic head 3, an actuator 4, and a pivot assembly bearing 10 including the ball bearing. The magnetic disk 2 is a medium that records information. The magnetic head 3 is arranged at the tip of the actuator 4 and moves on the magnetic disk 2 to record information in the magnetic disk 2 and to read the information recorded in the magnetic disk 2. In this process, the pivot assembly bearing 10 enables to oscillate the actuator 4 and move the magnetic head 3 to a specified position.

Figure 2:
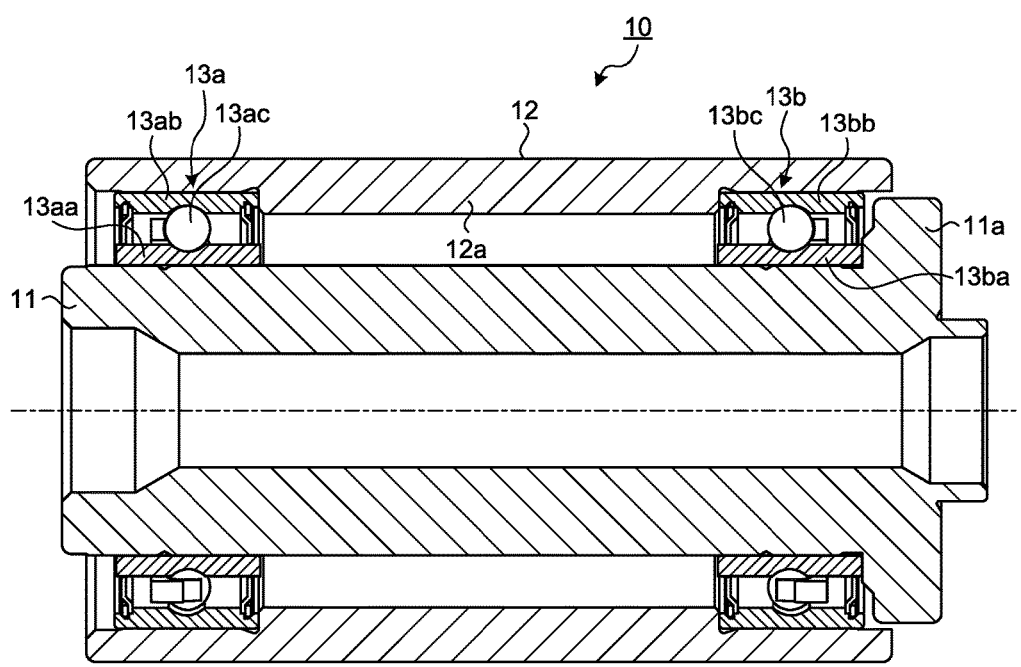
FIG. 2 is a sectional view of the pivot assembly bearing including the ball bearings.

FIG. 2 illustrates an example of the pivot assembly bearing including ball bearings 13a and 13b according to the present embodiment. The pivot assembly bearing 10 has a shaft 11, a housing 12, and a pair of ball bearings 13a and 13b. The shaft 11 is rotatably held by the pair of ball bearings 13a and 13b in upper and lower position respectively. In other words, the ball bearing 13a (13b) holds rolling elements 13ac (13bc) between an inner ring 13aa (13ba) and an outer ring 13ab (13bb). The inner ring 13aa (13ba) is fixed to the outer periphery of the shaft 11, and the outer ring 13ab (13bb) is fixed to the inside of the housing 12 which is a tubular structure. A gap between the inner ring 13aa (13ba) and the outer ring 13ab (13bb), the space around the rolling body 13ac (13bc), is filled with the grease composition.

The shaft 11 has a lower end side (the right side in FIG. 2) and an upper end side (the left side in FIG. 2). A flange 11a is formed on the lower end side of the shaft 11 with an outer diameter dimension smaller than the inner diameter of the housing 12 in order to fix the shaft 11 to a lower support part (not shown) provided on a base of the hard disk drive 1.

On the inner peripheral surface of the housing 12, a spacer 12a with which the end faces of the outer rings 13ab and 13bb are in contact is provided in order to position the upper bearing 13a and the lower ball bearing 13b spaced apart from each other in an axial direction. The housing 12 and the spacer 12a are not limited to an integrally formed configuration as illustrated in FIG. 2, and the housing 12 and the spacer 12a may be separated parts.

The ball bearing included in the pivot assembly bearing according to the present embodiment is filled with the grease composition excellent in outgas characteristic, oil separability, and low temperature torque characteristic. Therefore, when the ball bearing according to the present embodiment is used in the pivot assembly bearing, it is possible to provide a hard disk drive that has a long life and a low power consumption even at low temperatures.

More specifically, a reduction in outgas reduces oil contamination produced with time within the HDD and achieves the extension of the life of the HDD.

The above describes the pivot assembly bearing as the bearing device including the ball bearing according to the present embodiment and the hard disk drive as the device including such bearing device. However, even any bearing device other than the pivot assembly bearing can provide a device that has long life and low power consumption even at low temperatures so long as it includes the ball bearing according to the embodiment.

The following describes the present invention more specifically with reference to examples. However, the present invention is not limited to these examples.

EXAMPLES

Example 1

A hydrocarbon-based base oil was obtained by mixing 50 parts by mass of a poly-α-olefin oil (SPECTRASYN 10 manufactured by ExxonMobil Corporation, kinematic viscosity at 40° C.: 71 mm$^2$/s) and 50 parts by mass of a paraffinic mineral oil (P-90 manufactured by Idemitsu Kosan Co., Ltd., kinematic viscosity at 40° C.: 90 mm$^2$/s). A base oil was obtained by mixing 90 parts by mass of this hydrocarbon-based base oil and 10 parts by mass of a pentaerythritol ester oil (HATCOL 2352 manufactured by CHEMTURA Corporation, kinematic viscosity at 40° C.: 29 mm$^2$/s) as the other synthetic oil.

As raw material compounds for a thickener, that is, a diurea compound, 5 moles of diphenyl methane 4,4'-diisocyanate (DESMODOR 44M FLAKES manufactured by COVESTRO AG.), 3 moles of cyclohexyl amine (cyclohexyl amine manufactured by Wako Pure Chemical Industries, Ltd.), and 7 moles of stearyl amine (stearyl amine manufactured by Wako Pure Chemical Industries, Ltd.) were used.

Next, a composition was prepared so as to cause the thickener to be contained in an amount of 10 to 15 parts by mass for 100 parts by mass of the base oil. It is presumed that the composition after reaction contains an alicyclic-aliphatic diurea compound.

Next, 2 parts by mass of tricresyl phosphate (tricresyl phosphate manufactured by Wako Pure Chemical Industries, Ltd.) as the extreme pressure additive was added to 100 parts by mass of the above-obtained composition, and the mixture was thoroughly stirred to obtain a grease composition.

Furthermore, using the above grease composition, a ball bearing and a pivot assembly bearing including the ball bearing were manufactured for a life test described below.

Example 2

A grease composition, a ball bearing, and a pivot assembly bearing were obtained similarly to Example 1 except that the hydrocarbon-based base oil was obtained by mixing 30 parts by mass of the poly-α-olefin oil and 70 parts by mass of the paraffinic mineral oil.

Example 3

A grease composition, a ball bearing, and a pivot assembly bearing were obtained similarly to Example 1 except that the hydrocarbon-based base oil was obtained by mixing 70 parts by mass of the poly-α-olefin oil and 30 parts by mass of the paraffinic mineral oil.

Example 4

A grease composition, a ball bearing, and a pivot assembly bearing were obtained similarly to Example 1 except that the base oil was obtained by mixing 70 parts by mass of the hydrocarbon-based base oil and 30 parts by mass of the other synthetic oil.

Example 5

A grease composition, a ball bearing, and a pivot assembly bearing were obtained similarly to Example 1 except that the base oil was obtained by mixing 50 parts by mass of the hydrocarbon-based base oil and 50 parts by mass of the other synthetic oil.

Example 6

A grease composition, a ball bearing, and a pivot assembly bearing were obtained similarly to Example 1 except that the base oil was obtained by mixing 40 parts by mass of the hydrocarbon-based base oil and 60 parts by mass of the other synthetic oil.

The worked penetration (JIS K 2220 7) of the grease compositions obtained in Example 1 to Example 6 was 220 to 260.

Comparative Example 1

A hydrocarbon-based base oil was obtained by mixing 50 parts by mass of a poly-α-olefin oil (SPECTRASYN 6 manufactured by ExxonMobil Corporation, kinematic viscosity at 40° C.: 31 mm²/s) and 50 parts by mass of a paraffinic mineral oil.

A grease composition, a ball bearing, and a pivot assembly bearing were obtained similarly to Example 1 except that the hydrocarbon-based base oil alone was used as the base oil.

Comparative Example 2

A hydrocarbon-based base oil was obtained by mixing 50 parts by mass of a poly-α-olefin oil and 50 parts by mass of a paraffinic mineral oil.

A grease composition, a ball bearing, and a pivot assembly bearing were obtained similarly to Example 1 except that the hydrocarbon-based base oil alone was used as the base oil.

Comparative Example 3

A grease composition, a ball bearing, and a pivot assembly bearing were obtained similarly to Example 1 except that the base oil was obtained by mixing 98 parts by mass of the hydrocarbon-based base oil and 2 parts by mass of the other synthetic oil.

Comparative Example 4

A grease composition, a ball bearing, and a pivot assembly bearing were obtained similarly to Example 1 except that the base oil was obtained by mixing 30 parts by mass of the hydrocarbon-based base oil and 70 parts by mass of the other synthetic oil.

Comparative Example 5

A grease composition, a ball bearing, and a pivot assembly bearing were obtained similarly to Example 1 except that the pentaerythritol ester oil alone was used as the base oil.

Comparative Example 6

A grease composition, a ball bearing, and a pivot assembly bearing were obtained similarly to Example 1 except that an alkyl diphenyl ether oil (MORESCO HILUBE LB-68 manufactured by MORESCO Corporation, kinematic viscosity at 40° C.: 68 mm²/s) alone was used as the base oil.

Comparative Example 7

A grease composition, a ball bearing, and a pivot assembly bearing were obtained similarly to Example 1 except that a poly-α-olefin oil (SPECTRASYN 8 manufactured by ExxonMobil Corporation) with a kinematic viscosity at 40° C. of 48 mm²/s alone was used as the base oil.

Method of Evaluation

Evaluations of the grease composition, the ball bearing, and the pivot assembly bearing that had been obtained were performed as follows.

Kinematic Viscosity

Kinematic viscosity at 0° C. and kinematic viscosity at 40° C. were measured conforming to JIS K 2283.

Outgas Test

The total amount of gas obtained by heating the grease composition was determined using a gas chromatograph mass spectrometer (GCMS). The measurements by the GCMS were all performed under the same conditions (the amount of the grease composition, the heating temperature, and the heating time).

Evaluation criteria were as follows: the amount of outgas (ng/mg) being 200 or less was evaluated as A; the amount exceeding 200 and being 400 or less was evaluated as B; the amount exceeding 400 and being 500 or less was evaluated as C; and the amount exceeding 500 was evaluated as D.

Low Temperature Torque Test

The grease composition was applied between a disc and a cone of a rheometer rotational viscometer (MCR 301 manufactured by ANTON PAAR), and viscosity (torque) measurement was performed under the following conditions.

Test temperature: −20° C.

Shear rate: 10/s

Gap between disc and cone: 0.5 mm

Measurement time: 300 seconds

After the start of the measurement, a maximum value at the time of startup was determined, which was defined as a low temperature torque value.

Evaluation criteria were as follows: the low temperature torque value (mNm) being less than 15 was evaluated as A; the value being 15 or more and less than 20 was evaluated as B; the value being 20 or more and less than 25 was evaluated as C; and the value being 25 or more was evaluated as D.

Life Test

First, for the grease composition, torque before a life test was measured.

Next, the pivot assembly bearing including the ball bearing filled with the grease composition was set to a oscillating tester to carry out a life test with two hundred million seeks at 70° C.

Next, torque after the life test was measured, and a life was evaluated based on the average torque. In addition to the average torque value after the life test, also determined were oscillation marks on the race surface, seizing of the grease composition, discoloration of the grease composition, and the occurrence of sludge. Specifically, the torque after the test being 0.5 kgf·cm or less was evaluated as A; the torque exceeding 0.5 kgf·cm and being 0.8 kgf·cm or less was evaluated as B; the torque exceeding 0.8 kgf·cm and being 1.5 kgf·cm or less was evaluated as C; and the torque exceeding 1.5 kgf·cm was evaluated as D.

Oil Separation Test

A certain amount of the grease composition was placed on a paper surface, and the area of the part where exudation has occurred was divided by the total amount of the grease composition to determine the amount of oil separation.

Evaluation criteria were as follows: the amount of oil separation (mm²/mg) being 250 or more and less than 260 was evaluated as A; the amount being 230 or more and less than 250 was evaluated as B; the amount being 200 or more and less than 230 was evaluated as C; and the amount being less than 200 was evaluated as D.

Evaluation Results

Table 1 below lists the evaluation results.

TABLE 1

| | Hydrocarbon-based base oil (parts by mass) | Another synthetic oil (parts by mass) | Kinematic viscosity of base oil (mm2/s) | | Outgas | Low temperature torque | Life | Oil separation | Overall evaluation |
|---|---|---|---|---|---|---|---|---|---|
| | | | @40° C. | @0° C. | | | | | |
| Example 1 | 90 | 10 | 67 | 763 | B | B | A | A | A |
| Example 2 | | | 70 | 796 | C | C | B | A | C |
| Example 3 | | | 63 | 694 | B | B | C | A | B |
| Example 4 | 70 | 30 | 56 | 570 | B | B | A | A | A |
| Example 5 | 50 | 50 | 45 | 443 | B | B | B | C | B |
| Example 6 | 40 | 60 | 41 | 388 | B | B | C | C | C |
| Comparative Example 1 | 100 | 0 | 52 | 508 | D | B | C | A | D |
| Comparative Example 2 | 100 | 0 | 74 | 846 | C | D | A | B | D |
| Comparative Example 3 | 98 | 2 | 72 | 841 | C | D | B | B | D |
| Comparative Example 4 | 30 | 70 | 37 | 339 | B | A | D | C | D |
| Comparative Example 5 | 0 | 100 | 30 | 246 | A | A | D | D | D |
| Comparative Example 6 | 0 | 100 | 67 | 820 | A | D | D | D | D |
| Comparative Example 7 | 100 | 0 | 48 | 492 | D | B | D | B | D |

Using the grease composition prepared as described above, the pivot assembly bearing 10 including the ball bearing as illustrated in FIG. 2 can be manufactured, and the hard disk drive 1 as illustrated in FIG. 1 can be manufactured using the pivot assembly bearing 10. It is considered that the obtained hard disk drive has a long life and can be driven even at low temperature.

A ball bearing according to an embodiment of the present invention is filled with a grease composition excellent in outgas characteristic, oil separability, and low temperature torque characteristic, and the ball bearing can be used for a pivot assembly bearing, whereby a hard disk drive that has a long life and that can be used with low power consumption even at low temperature is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ball bearing with a grease composition,
the grease composition comprising a polyol ester oil, a poly-α-olefin, a mineral oil and a urea compound, wherein
the polyol ester oil is contained in an amount of 10% by mass or more and 60% by mass or less when a total of the polyol ester oil, the poly-α-olefin and the mineral oil is 100% by mass.

2. The ball bearing according to claim 1, wherein
the grease composition comprises the polyol ester oil in an amount of 10% by mass or more and 30% by mass or less when the total of the polyol ester oil, the poly-α-olefin and the mineral oil is 100% by mass.

3. The ball bearing according to claim 2, wherein
the grease composition comprises the poly-α-olefin in an amount of 30% by mass or more and 70% by mass or less when a total of the poly-α-olefin and the mineral oil is 100% by mass.

4. The ball bearing according to claim 2, wherein
the grease composition further comprises an extreme pressure additive.

5. A pivot assembly bearing comprising the ball bearing according to claim 2.

6. The ball bearing according to claim 1, wherein
the grease composition comprises the poly-α-olefin in an amount of 30% by mass or more and 70% by mass or less when a total of the poly-α-olefin and the mineral oil is 100% by mass.

7. The ball bearing according to claim 6, wherein
the grease composition further comprises an extreme pressure additive.

8. A pivot assembly bearing comprising the ball bearing according to claim 6.

9. The ball bearing according to claim 1, wherein
the grease composition further comprises an extreme pressure additive.

10. A pivot assembly bearing comprising the ball bearing according to claim 9.

11. A pivot assembly bearing comprising the ball bearing according to claim 1.

12. A hard disk drive comprising the pivot assembly bearing according to claim 11.

* * * * *